United States Patent [19]

Avakian

[11] Patent Number: 4,508,861

[45] Date of Patent: Apr. 2, 1985

[54] THERMALLY STABILIZED POLYETHERIMIDES

[75] Inventor: Roger W. Avakian, Pittsfield, Mass.

[73] Assignee: General Electric Company, Pittsfield, Mass.

[21] Appl. No.: 566,698

[22] Filed: Dec. 29, 1983

[51] Int. Cl.$^3$ ............................................. C08K 5/53
[52] U.S. Cl. .................................... 524/101; 524/115; 524/117; 524/141; 524/147; 524/151; 524/303; 524/304; 524/120; 524/333; 524/349; 524/602
[58] Field of Search ............... 524/126, 115, 141, 147, 524/151, 349, 303, 304, 602, 101; 428/435, 473.5; 528/342, 347, 348; 524/170, 330, 333, 120, 114

[56] References Cited

U.S. PATENT DOCUMENTS

| | | | |
|---|---|---|---|
| 3,285,855 | 11/1966 | Dexter et al. ........................ 252/57 |
| 3,330,859 | 7/1967 | Dexter et al. ........................ 260/473 |
| 3,847,867 | 11/1974 | Heath et al. ........................ 260/47 CP |
| 3,847,869 | 11/1974 | Williams ........................ 260/47 CZ |
| 3,849,370 | 11/1974 | Minagawa et al. ........................ 260/45.8 N |
| 3,850,885 | 11/1974 | Takekoshi et al. ........................ 260/47 CZ |
| 3,852,242 | 12/1974 | White ........................ 260/47 CZ |
| 3,855,178 | 12/1974 | White et al. ........................ 260/45.7 S |
| 4,025,486 | 5/1977 | Gilles ........................ 524/101 |
| 4,054,705 | 10/1977 | Vassiliou ........................ 428/473.5 |
| 4,107,138 | 8/1978 | Hofer et al. ........................ 524/126 |
| 4,185,006 | 1/1980 | Rasberger et al. ........................ 524/101 |
| 4,211,731 | 7/1980 | Hofer et al. ........................ 524/126 |
| 4,224,218 | 9/1980 | Minagawa et al. ........................ 260/45.7 PH |
| 4,263,230 | 4/1981 | Uhing ........................ 524/126 |
| 4,276,233 | 6/1981 | Markezich et al. ........................ 524/151 |
| 4,302,575 | 11/1981 | Takekoshi ........................ 428/473.5 |
| 4,314,047 | 2/1982 | Banucci et al. ........................ 428/473.5 |
| 4,385,143 | 5/1983 | Yachigo et al. ........................ 524/304 |
| 4,427,814 | 1/1984 | Sugio ........................ 524/126 |

FOREIGN PATENT DOCUMENTS 257010 6/1970 U.S.S.R. .

OTHER PUBLICATIONS

Paolino, *Plastics Design Processing*, May 1980, pp. 43–46.
Koton, M. M. and Florinski, F. S., *Zh. Org. Khin.*, 4(5):774, (1968).

*Primary Examiner*—Veronica P. Hoke
*Attorney, Agent, or Firm*—Bernard, Rothwell & Brown

[57] ABSTRACT

A thermally stabilized polyetherimide composition is disclosed which contains a polyetherimide and a stabilizing amount of an antioxidant having a molecular weight of 400 and is selected from the group of hindered phenols, aryl phosphonites, organic phosphites, thioesters or mixtures thereof. The stabilized polyetherimides exhibit a prolonged stability under conditions of elevated temperatures.

23 Claims, No Drawings

THERMALLY STABILIZED POLYETHERIMIDES

BACKGROUND OF THE INVENTION

The present invention relates to thermally stabilized polyetherimides. More particularly, the invention concerns polyetherimides which have been stabilized against loss of strength and other mechanical properties upon heating and aging.

Polyetherimides are unique polymers which exhibit superior physical and chemical properties, including high heat resistance, exceptional strength and excellent processability. These polymers can be used as wire coatings and are particularly suited for injection molding applications. Because of their excellent heat resistance and high glass transition temperatures, these polymers are often used in high performance applications, where they are exposed to elevated temperatures and high mechanical loads. Although polyetherimides are excellently suited to such applications, there is a continuing need for high performance polymers, particularly those that can be formed into useful articles by the relatively convenient and inexpensive technique of injection molding.

As will be more fully described herein, polyetherimides may be made by a variety of synthetic procedures. Presently, the preferred procedures for the commercial production of these polymers involves a step known as "melt polymerization." In the melt polymerization process, a mixture of an aromatic bis(ether anhydride) and an organic diamine (or a prepolymer thereof) is introduced into a heated extruder, wherein the reactants are melted. The reaction of these components occurs in the molten state, and the molten product is extruded through a die, after which it is cooled and chopped into pellets that can be conveniently utilized in injection molding applications. The processing temperatures associated with these production techniques can be quite high. For example, temperatures on the order of 400° C. and higher are employed in the extruder. Moreover, because of the high glass transition temperatures of these resins, injection molding must generally be conducted at similarly high temperatures.

Because of the elevated temperatures involved in the production and processing of polyetherimides, stabilizing these polymers against thermal degradation or deterioration has proved to be difficult. Typical polymer-stabilizing compounds are, themselves, unstable or poorly stable at these elevated temperatures. Inorganic stabilizers or organometalic stabilizers can have good stability, but suffer from the disadvantage that they are often incompatible with polyetherimides. These compounds cause discoloration and streaking of the resulting products, which can be disadvantageous for many applications.

A wide variety of substances, including polymers, are stabilized against heat degradation or deterioration by employing small amounts of antioxidants. Numerous antioxidants have been developed and are employed for stabilizing various polymers. Such antioxidants include secondary aryl amines, hindered phenols, organic phosphites, and thioesters, to name a few. For a review of the factors involved with the stabilization of polymers using antixodants, see Paolino, P. R., *Plastics Design and Processing*, May 1980.

Important considerations for the selection of an antioxidant system include the compatibility of the antioxidant with the polymer system, the thermal stability of the antioxidant compound over the temperature ranges to which the polymer will be exposed, the volatility of the antioxidant compound, the effectiveness of the antioxidant in stabilizing the polymer, and the effect the antioxidant has on various physical properties of the polymer. In general, polymer stabilization using antioxidants has heretofore been limited to relatively low temperature applications. For example, polyethylenes, polypropylenes, polyurethanes, polyacrylates, and the like are manufactured and processed at temperatures lower than about 400° F. and usually below about 300° F. The antioxidant systems used to stabilize such polymers have generally been found unsatisfactory for the stabilization of polyetherimides, because of one or more of the considerations recited above. In particular, such antioxidants have met with limited success for polyetherimides because of the high processing temperatures employed. Antioxidants tend to be volatile and/or thermally unstable at these temperatures.

Accordingly, there is a continuing need for thermally stabilized polyetherimides whose useful temperature ranges are even broader than those presently available.

SUMMARY OF THE INVENTION

In accordance with the present invention, a thermally stabilized polyetherimide comprises a polyetherimide and a stabilizing amount of an antioxidant selected from the group consisting of (a) a hindered phenol, (b) an arylphosphonite, (c) an organic phosphite, (d) a thioester, (e) mixtures thereof, wherein said antioxidant has a molecular weight greater than about 400. These compositions surprisingly exhibit a prolonged stability over corresponding unstabilized polyetherimides, under conditions of elevated temperatures. As a result, such compositions resist physical failure for longer periods of time than do the corresponding polyetherimides.

DETAILED DESCRIPTION

The thermally stabilized polyetherimides of the present invention include a polyetherimide of the formula:

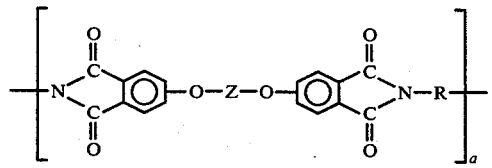

where "a" represents a whole number in excess of 1, e.g., 10 to 10,000 or more, Z is a member selected from the class consisting of (1):

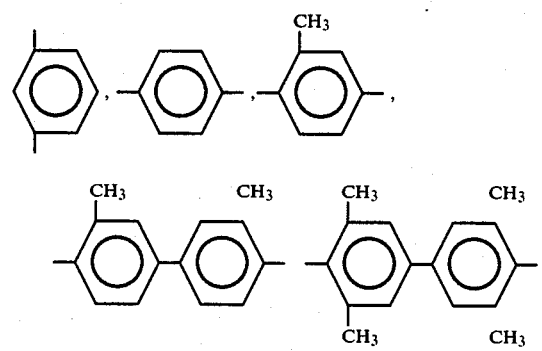

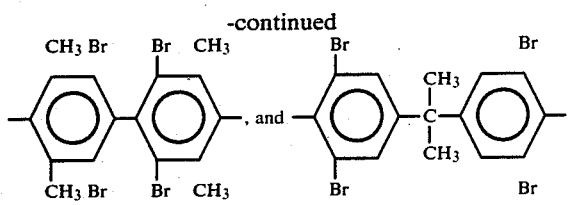

and (2) divalent organic radicals of the general structural formula:

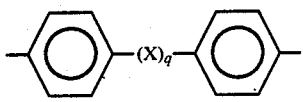

where X is a member selected from the class consisting of divalent radicals of the formulas,

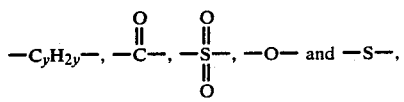

where q is 0 or 1, y is an integer from 1 to 5, and the divalent bonds of the —O—Z—O— radical are situated on the phthalic anhydride end groups, e.g., in the 3,3', 3,4', 4,3' or the 4,4' positions and R, is a divalent organic radical selected from the class consisting of aromatic hydrocarbon radicals having from 6 to about 20 carbon atoms and halogenated derivatives thereof, alkylene radicals and cycloalkylene radicals having from about 2 to about 20 carbon atoms, $C_{(2-8)}$ alkylene terminated polydiorganosiloxane, and divalent radicals of the formula:

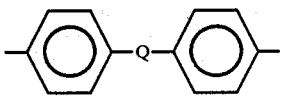

where Q is a member selected from the class consisting of

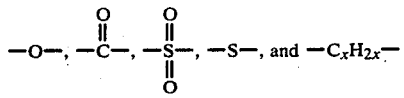

and x is an integer from 0 to 5.

The polyetherimides can be obtained by any of the methods well known to those skilled in the art including the reaction of any aromatic bis(ether anhydride)s of the formula:

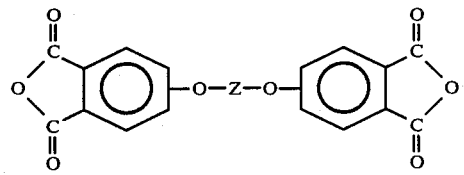

where Z is as defined hereinbefore with an organic diamine of the formula:

$$H_2N—R—NH_2$$

where R is as defined hereinbefore.

Aromatic bis(ether anhydride)s of the above formula include, for example, 2,2-bis[4-2,3-dicarboxyphenoxy)-phenyl]phenyl ether dianhydride; 1,3-bis(2,3-dicarboxyphenoxy)benzend dianhydride; 4,4'-bi(2,3-dicarboxyphenoxy)diphenyl sulfide dianhydride; bis(2,3-dicarboxyphenoxy)benzophenone dianhydride; 4,4'-bis(2,3-dicarboxyphenoxy)diphenyl sulfone dianhydride; etc., 2,2-bis[4-(3,4-dicarboxyphenoxy)phenyl]propanedianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'(3,4-dicarboxy phenoxy)diphenyl-2,2 2-propane dianhydride; etc. and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic Compounds, Academy of Sciences, U.S.S.R.), U.S.S.R. No. 257,010, Nov. 11, 1969, Appl. May 3, 1967. In addition, dianhydrides are shown by M. M. Koton, F. S. Florinski, Zh. Org. Khin, 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diamindoiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4-bis(B-amino-t-butyl(toluene, bis(p-B-methyl-o-maminopentyl)benzene, 1,3-diamino-4-isopropylbenzene, 1,2-bis(3-aminopropoxy)ethane, m-xylylenediamine, p-xylylenediamine, 2,4-diaminoluene, 2,6-diaminotoluene, bis(4-aminocyclohexyl)methane, 3-methylheptamethylenediamine, 4,4-dimethylheptamethyleneidamine, 2,11-dodecanediamine, 2,2-dimethylpropylenediamine, octamethylenediamine, 3 methoxyethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane and the like, and mixtures of such diamines.

In general, the reactions can be advantageously carried out employing well-known solvents, e.g., o-dichlorobenzene, m-cresol/toluene, etc. in which to effect interaction between the dianhydrides and the diamines, at temperatures of from about 100° to about 250° C. Alternatively, the polyetherimides can be prepared by melt polymerization of any of the aforementioned dianhydrides with any of the aforementioned diamino compounds while compounds heating the mixture of the ingredients at elevated temperature with concurrent intermixing. Generally, melt polymerization temperatures between about 200° to 400° C. or higher are employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [N] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al. 3,847,867, Williams 3,847,869, Takekoshi et al. 3,850,885, White 3,852,242 and 3,855,178. These disclosures are incorporated herein in their entirety by reference for the purpose of teaching, by way of illustration, general and specific methods for preparing polyetherimides suitable for the blends of this invention.

The thermally stabilized polyetherimides of the present invention include an antioxidant selected from one of the following four categories, or mixtures thereof.

(a) Hindered Phenols of the following structural formula:

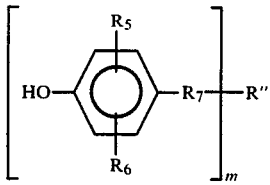

wherein $R_5$ and $R_6$ may be the same or different and are selected from the group consisting of alkyl radicals having from 1 to 20 carbon atoms, $R_7$ is selected from the group of radicals consisting of hydrogen, alkylene having from 1 to 11 carbon atoms and radicals of the following structural formula:

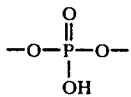

wherein m is an integer of from 1 to 4 and R" is selected from the group of radicals consisting of alkyls having from 1 to 30 carbon atoms, aryls having a total of from 6 to 24 carbon atoms, cycloalkyls having from 6 to 24 carbon atoms, alkaryls having from 7 to 12 carbon atoms and any of the above described alkyl, aryl, cycloalkyl or alkaryls further containing 1 or more ether or ester linkages. Said R" may further be selected from groups of the formulas:

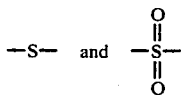

Preferably, $R_5$ and $R_6$ are selected from the group of alkyl radicals having 2 to 10 carbon atoms, $R_7$ is selected from the group of alkylene radicals having 2 to 4 carbon atoms and R" is of the following structural formula:

where n is an integer of from 10 to 20. A particularly preferred hindered phenol is one in which $R_5$ and $R_6$ are alkyl radicals having 4 carbon atoms, $R_7$ is an alkylene radical having 2 carbon atoms and R" is of the structural formula:

where n is 18.

Examples of the hindered phenol compounds used in the present invention are described in U.S. Pat. Nos. 3,285,855 and 3,330,859.

Other hindered phenols that can be used are trifunctional, high molecular weight hindered phenols of the formula:

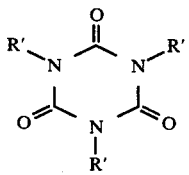

where R' is selected from the following formula:

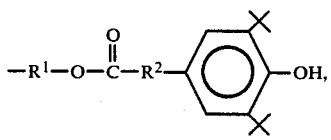

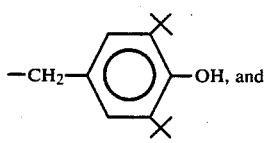

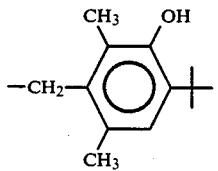

where $R_1$ and $R_2$ can be the same or different and are selected from the group of alkylene radicals having from 1 to 10 carbon atoms. Preferably $R_1$ and $R_2$ are selected from the group of alkylene radicals having 2 to 4 carbon atoms. Particularly preferred is when $R_1$ and $R_2$ are alkylene radicals of 2 carbon atoms.

Some examples of commercial antioxidants of the above referenced tri-functional, high molecular weight hindered phenols are Good-rite ® 3125 and Goodrite ® 3114, commercially produced by The B.F. Goodrich Company of Akron, Ohio. Another commercial antioxidant is Cyanox ® 1790 and is commercially produced by American Cyanamid Co., of Wayne, N.J.

(b) Arylphosphonites of the following structural formula:

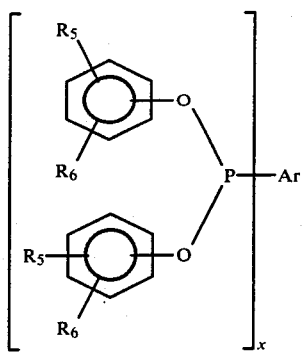

wherein x is an integer from 1 to 3 and wherein $R_5$ and $R_6$ may be the same or different and are each selected from the group consisting of alkyl radicals having from 1 to 20 carbon atoms, and Ar is a monocyclic or polycyclic aromatic group containing from 6 to 18 carbon atoms. Preferably x is 2, $R_5$ and $R_6$ are independently selected from the group consisting of alkyl radicals having 2 to 10 carbon atoms and Ar is a polycyclic aromatic group having 12 to 18 carbon atoms. Particularly preferred arylphosphonites are those in which x is 2, $R_5$ and $R_6$ are alkyl radicals having 4 carbon atoms and Ar is p-diphenylene.

(c) Organic phosphites of the following structural formula:

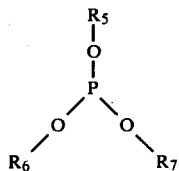

where $R_5$, $R_6$ and $R_7$ may be the same or different and are selected from the group of radicals consisting of alkyl having 12 to 25 carbon atoms, aralkyl having 10 to 14 carbon atoms and aryls of from 6 to 18 carbon atoms. Preferably $R_5$, $R_6$ and $R_7$ are independently selected from the group consisting of alkaryls having 12 to 14 carbon atoms with alkaryls of 14 carbon atoms being the most preferred.

Other organic phosphites that can be used are of the structural formula:

wherein $R_7$ may be the same or different and is selected from the group of radicals consisting of alkyls of from 15 to 25 carbon atoms, aryls of from 6 to 24 carbon atoms, and alkaryls having from 7 to 18 carbon atoms. In preferred compounds of this formula $R_7$ is an alkyl containing from 15 to 20 carbon atoms.

(d) Thioesters of the following structured formula:

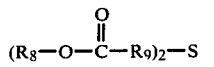

or

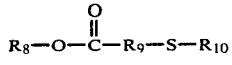

where $R_{10}$ = lower alkyl of 6-18 C atoms, and wherein each of $R_9$ may be the same or different from the other and is selected from the group of alkylene radicals of from 1 to 10 carbon atoms and each of $R_8$ may be the same or different from the other and is selected from the group consisting of hydrocarbon radicals of from 4 to 25 carbon atoms. In preferred antioxidants of this formula, each of $R_9$ is an alkylene radical having 2 to about 6 carbon atoms and each of $R_8$ is an alkyl radical of from 10 to 20 carbon atoms. In particularly preferred thioesters, $R_8$ is an alkyl radical having 18 carbon atoms and $R_9$ is an alkylene radical having 2 carbon atoms.

Mixtures of the antioxidants described herein may advantageously be employed in the stabilized polymers of the present invention. For example, synergistic activity has been observed when hindered phenolic antioxidants of formula (a) are combined with the antioxidants of the other three formulas. Ternary mixtures of these antioxidants may also be employed, however, no particular advantage over the individual antioxidants or binary mixtures thereof has been observed.

It has unexpectedly been found that polyetherimides can be substantially stabilized against heat degradation by employment of the antioxidants of the foregoing formulas and having molecular weights in an excess of 400. Compounds having these formulas and molecular weights greater than about 400 have surprisingly been found to be compatible with polyetherimides, and are thermally stable at the high temperatures employed, and yet have a stabilizing effect on the polyetherimide polymers.

In addition to having a molecular weight in excess of 400, the antioxidants for use in the composition of this invention are further characterized by their thermogravimetric patterns. Below are listed various commercial antioxidants and their respective thermogravimetric patterns. These data show the temperatures at which weight losses of 5%, 10% and 15% respectively occur.

| Conditions: ~5 mg samples Heating rate 20° C./min. Dry air | | | |
|---|---|---|---|
| | Weight Loss (%) | | |
| Antioxidant | 5% | 10% | 15% |
| Goodrite 3125 | 363° C. | 378° C. | 387° C. |
| Sandostab PEPQ | 235° C. | 284° C. | 310° C. |
| Irganox 1076 | 297° C. | 315° C. | 326° C. |
| Distearyl Thiodipropionate | 250° C. | 291° C. | 315° C. |
| Weston 626 | 199° C. | 246° C. | 272° C. |
| Butylated Hydroxy Toluene | 117° C. | 130° C. | 140° C. |
| Weston 618 | 210° C. | 255° C. | 300° C. |

Because of the elevated temperatures involved in the production and processing of polyetherimides, one should employ an antioxidant that does not result in a 5% weight loss below the glass transition temperature of particular polyetherimide used, typically 190° C. to 215° C. Under the above test conditions, suitable antioxidants are those that retain 95% of its original weight at a temperature of 190° C. and above.

Although antioxidants having the characteristics described herein and mixtures thereof have generally been found effective in stabilizing polyetherimides, the manner in which the polyetherimide was made influences to some extent the selection of the antioxidant. For polyetherimides prepared by catalyzed reactions, higher loadings of the antioxidant are generally required, and the arylphosphonite antioxidants of formula (b) are preferred. For resins prepared without the use of a catalyst, lower antioxidant loadings may be employed, and hindered phenolic antioxidants of formula (a) and arylphosphonites are generally preferred. The concentration of the antioxidant system in the polyetherimide may vary widely, providing that stabilizing amounts of the antioxidant are employed. These amounts generally range from about 0.02 weight percent to about 1.0 weight percent of the stabilized polymer. Preferably the amount of antioxidant is from 0.05 to 0.5 weight percent of the stabilized polymer.

The organic phosphite antioxidant of formula (c) may contain acidic impurities which deleteriously affect the stability and mechanical properties of the polyetherimide. It has been found that the properties of this stabilizer can be improved substantially by admixing therewith a reactive epoxide of the formula:

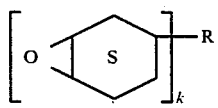

wherein k is an integer of from 1 to 3 and R is selected from the group of alkylene radicals having 1 to 10 carbon atoms, phenylene radicals and alkylene radicals of 1 to 10 carbon atoms and phenylene groups further containing 1 or more ester or ether groups.

Preferably, the reactive epoxide is of the formula:

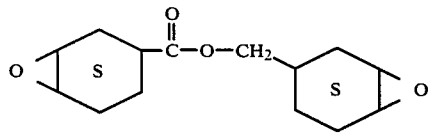

The weight ratio of phosphite to epoxide may generally range from about 1:5 to 1:30, preferably from about 1:10 to about 1:25.

The thermally stabilized polyetherimides of this invention have been found to possess substantially greater stabilities than unstabilized resins at elevated temperatures. This stability can be demonstrated by exposing articles formed from the resin to elevated temperatures and measuring mechanical properties, such as tensile strength. Such tests have shown that improvements in tensile strength by as much as 50-100% are achieved with the stabilized polyetherimides of the present invention.

The invention is further illustrated by the following examples which are not intended to be limiting.

EXAMPLES

Several different batches of polyetherimide prepared by different synthetic methods were blended with the antioxidant compounds described above in accordance with the present invention. These materials were blended by mixing the solid antioxidant and polyetherimide resin pellets and coextruding to a standard shape used for tensile strength testing (8½ inch by ⅛ inch bars). Each of these bars was exposed to a temperature of 230° C. in a convection oven, and the tensile strength was measured on a commercial tester (Instron Mechanical Tester). Various percentages of commercially available antioxidants were used.

As the hindered phenolic compound of formula (a) above, a commercially available compound known as Irganox®1076 (Ciba-Gegy Corporation, Ardsley, N.Y., U.S.A.) was used. This compound has the following formula:

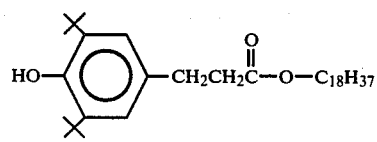

As the organic phosphonite, the commercially available compound known as Sandostab ™ PEPQ (Sandoz Colors and Chemicals, East Hanover, N.J., U.S.A.) was employed. This compound has the following structure:

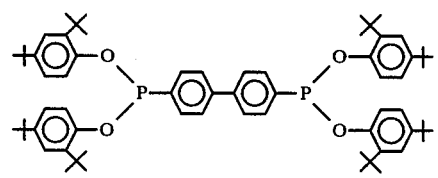

The organic phosphite used is known as Weston 618 and is available from Borg-Warner Corporation, Chicago, Ill., U.S.A. This compound has the following formula:

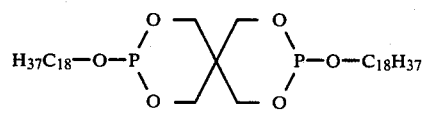

When the above organic phosphite was admixed with a reactive epoxide, the epoxide compound employed was obtained from Union Carbide Corporation as ERL 4221. ERL 4221 has the following structural formula:

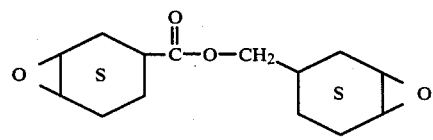

The resulting mixture is identified herein as the "EP Adduct."

As the thioester compound of formula (d) above, a compound of the following formula:

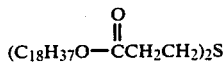

was employed. This compound is available from Evans Chemetics, Organic Chemical Div., W. R. Grace & Co., Darien, CT. This compound is identified herein as STDP.

EXAMPLES 1-7

The polyetherimide resin used in examples 1-7 were obtained using the uncatalyzed melt polymerization technique. The results of these examples are summarized in Table I below. The resin of example 1 did not have any antioxidant added and was run for compara-tive purposes. The weight percentage of each antioxidant in each composition is listed. The tensile strength for various exposure times at 230° C. are also shown. For the various exposure times, the tensile strength as a percentage of the tensile strength at 0 hours are given.

TABLE I

|  | Example | | | | | | |
|---|---|---|---|---|---|---|---|
|  | 1 | 2 | 3 | 4 | 5 | 6 | 7 |
| Resin (Catalyzed) | No | No | No | No | No | No | No |
| Antioxidant (wgt %) | | | | | | | |
| PEPQ | | .1 | | | | .1 | .5 |
| Irganox 1076 | | .1 | .1 | .5 | .5 | | |
| Weston 618 | | | .1 | .5 | | | |
| EP Adduct | | | | | | .1 | |
| STDP | | .1 | | | | | |
| Exposure Time (HRS) | | | | | | | |
| 0 | 14,892 | 15,853 | 15,132 | 15,676 | 15,436 | 14,901 | 14,915 |
| 300 | 14,663 (98%) | 14,934 (94%) | 5,585 (37%) | 15,071 (96%) | 12,273 (79%) | 12,441 (83%) | 14,026 (94%) |
| 500 | 11,005 (74%) | 12,112 (76%) | 6,122 (40%) | 14,503 (92%) | 10,688 (69%) | 9,232 (62%) | 11,352 (76%) |
| 600 | | | | | | | |
| 700 | | 10,505 (66%) | | 12,476 (79%) | 7,751 (50%) | 7,166 (48%) | 6,632 (44%) |
| 1000 | 7,288 (49%) | 9,231 (58%) | | 10,346 (66%) | | 7,242 (49%) | 5,321 (36%) |
| 1500 | 5,796 (39%) | | | | | 6,364 (43%) | |
| 2225 | | | | | | | |

EXAMPLES 8-24

The polyetherimide resins used in these examples were obtained by a catalyzed melt polymerization. Three lots of resin were prepared using different levels of catalyst. The results from the examples were listed below in Table II. The resin of examples 8, 19 and 22 were run for comparative purposes and did not have any antioxidant added.

TABLE II

|  | Examples | | | | | | | | |
|---|---|---|---|---|---|---|---|---|---|
|  | 8 | 9 | 10 | 11 | 12 | 13 | 14 | 15 | 16 |
| Catalyst level (ppm) | 350 | 350 | 350 | 350 | 350 | 350 | 350 | 350 | 350 |
| Antioxidant (wgt %) | | | | | | | | | |
| PEPQ | | .1 | | .1 | | | | .1 | .5 |
| Irganox 1076 | | | .1 | .1 | .1 | | .1 | .1 | |
| Weston 618 | | | | | | | | | |
| EP Adduct | | | | | .1 | .1 | | | |
| STDP | | | | | | | | | |
| Exposure Time (HRS) | | | | | | | | | |
| 0 | 14,818 | 15,342 | 15,027 | 15,069 | 15,085 | 16,087 | 15,207 | 15,271 | 14,868 |
| 300 | 10,211 (69%) | 14,756 (96%) | 7,762 (51%) | 15,279 (101%) | 15,495 (103%) | 15,051 (94%) | 9,042 (59%) | 9,039 (59%) | 15,407 (103%) |
| 500 | 3,422 (23%) | | 3,857 (25%) | | 9,728 (64%) | 9,008 (56%) | 6,428 (42%) | 7,946 (52%) | |
| 600 | | 6,509 (42%) | | 6,530 (43%) | | | | | 11,277 (76%) |
| 700 | | 5,259 (34%) | | 3,481 (23%) | 6,640 (45%) | 5,688 (35%) | 5,639 (37%) | 5,729 (37%) | 10,033 (67%) |
| 1000 | | 4,226 (27%) | | 5,657 (38%) | | | | | 5,906 (40%) |
| 1500 | | 4,872 (32%) | | 7,567 (50%) | | | | | 6,235 (42%) |
| 2225 | | | | | | | | | |

|  | Examples | | | | | | | |
|---|---|---|---|---|---|---|---|---|
|  | 17 | 18 | 19 | 20 | 21 | 22 | 23 | 24 |
| Catalyst level (ppm) | 350 | 350 | 208 | 208 | 208 | 495 | 495 | 495 |
| Antioxidant | | | | | | | | |

TABLE II-continued

| (wgt %) | | | | | | | | |
|---|---|---|---|---|---|---|---|---|
| PEPQ | .5 | | .1 | .5 | | .1 | | .5 |
| Irganox 1076 | .5 | | .1 | | | .1 | | |
| Weston 618 | | | | | | | | |
| EP Adduct | | | | | | | | |
| STDP | | | | | | | | |
| Exposure Time (Hrs) | | | | | | | | |
| 0 | 15,291 | 14,990 | 14,304 | 15,223 | 15,503 | 15,275 | 15,331 | 15,417 |
| 300 | 14,412 (94%) | 15,161 (101%) | 15,554 (105%) | 13,851 (91%) | 14,807 (96%) | 14,583 (95%) | 4,503 (29%) | 13,137 (85%) |
| 500 | 13,653 (89%) | | 13,029 (88%) | 7,800 (51%) | 12,368 (80%) | 11,786 (77%) | 5,183 (33%) | 10,424 (67%) |
| 600 | | 11,183 (75%) | | | | | | |
| 700 | 11,864 (77%) | 8,312 (55%) | 10,143 (68%) | 6,091 (40%) | 8,771 (56%) | | | 7,113 46% |
| 1000 | | 4,905 (33%) | | | | | | |
| 1500 | 5,627 (38%) | | | | | | | |

EXAMPLES 25-27

The polyetherimide resins used in examples 25-27 were obtained by a procedure in which a prepolymer is formed by a solution polymerization technique, and the polymers formed by thin film evaporation of the solvent from the prepolymer, followed by the final polymerization step in a heated extrusion apparatus. This process is described in copending application Ser. No. 381,859, Parekh. Example 25 was run for comparative purposes and did not have any antioxidant added. Table III below lists the data for examples 25-27 including the amount of catalyst used in preparation of the resin.

TABLE III

| Examples | 25 | 26 | 27 |
|---|---|---|---|
| Catalyst level (ppm) | 225 | 225 | 225 |
| Antioxidant (wgt %) | | | |
| PEPQ | | .1 | .5 |
| Irganox 1076 | | .1 | |
| Weston 618 | | | |
| EP Adduct | | | |
| STDP | | | |
| Exposure Time (Hrs) | | | |
| 0 | 15,106 | 15,232 | 15,354 |
| 300 | 10,938 (72%) | 12,812 (84%) | 13,912 (90%) |
| 500 | 3,203 (21%) | 6,467 (42%) | 10,440 (68%) |
| 600 | | | |
| 700 | | 4,837 (32%) | 8,535 (44%) |
| 1000 | | 5,868 (38%) | 9,090 (59%) |
| 1,500 | | | |
| 2,225 | | | 7,165 (46%) |

As is apparent from the preceding examples, the stabilized polyetherimides of the present invention surprisingly exhibit a prolonged stability over corresponding unstabilized polyetherimides, under conditions of elevated temperatures.

While certain representative embodiments and details have been shown for the purpose of illustrating the invention, it will be apparent to those skilled in the art that various changes and modifications may be made therein without departing from the scope of the invention.

I claim:

1. A thermally stabilized polyetherimide which comprises a polyetherimide and a stabilizing amount of antioxidant selected from the group comprising (a) a hindered phenol, (b) an arylphosphonite, (c) an organic phosphite, (d) a thioester, and (e) mixtures thereof, wherein said antioxidant has a molecular weight greater than 400.

2. The thermally stabilized polyetherimide of claim 1, wherein said polyetherimide is represented by the formula:

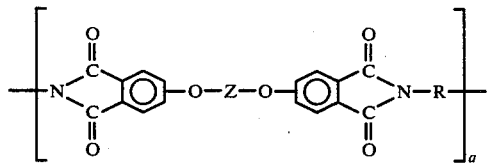

where "a" is an integer from 10 to 10,000, Z is a member selected from the class consisting of (1):

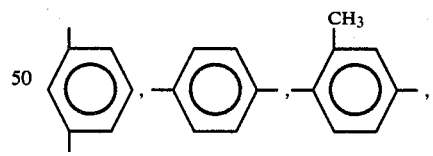

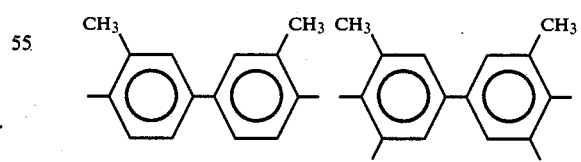

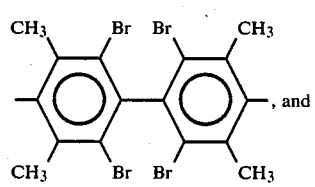

, and

-continued

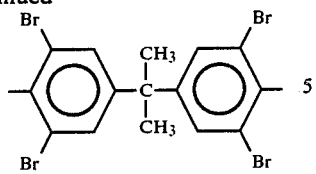

and (2) divalent organic radicals of the general structural formula:

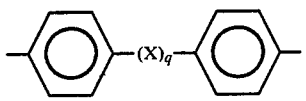

where X is a member selected from the class consisting of divalent radicals of the formulas,

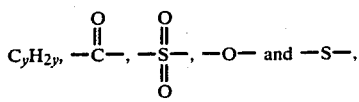

where q is 0 or 1, y is an integer from 1 to 5, and the divalent bonds of the —O—Z—O— radical are situated on the phthalic anhydride end groups in the 3,3', 3,4', 4,3' or the 4,4' positions and R, is a divalent organic radical selected from the class consisting of aromatic hydrocarbon radicals having 6-20 carbon atoms and halo genated derivatives thereof, alkylene radicals and cycloalkylene radicals having from 2-20 carbon atoms, $C_{(2-8)}$ alkylene terminated polydiorganosiloxane, and divalent radicals of the formula:

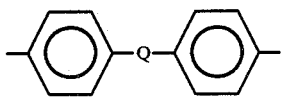

where Q is a member selected from the class consisting of

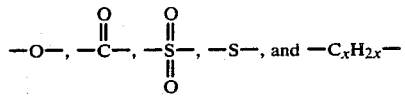

and x is an integer from 1 to 5.

3. The thermally stabilized polyetherimide of claim 1 wherein said hindered phenol is of the formula:

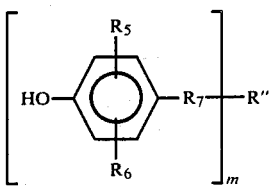

wherein $R_5$ and $R_6$ may be the same or different and are selected from the group consisting of alkyl radicals having from 1 to 20 carbons, $R_7$ is selected from the group consisting of a hydrogen radical, alkyl radicals having from 1 to 11 carbon atoms and radicals of the following structural formula:

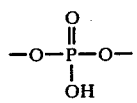

wherein m is an integer of from 1 to 4 and R" is selected from the group of alkyl radicals having from 1 to 30 carbon atoms, aryl radicals having a total of from 6 to 24 carbon atoms, cycloalkyl radicals having from 6 to 24 carbon atoms, alkaryl having 7 to 12 carbon atoms,

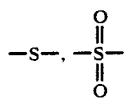

and said alkyl, aryl, cycloalkyl, alkaryl substituted aryl radicals further containing ester or ether linkages.

4. The thermally stabilized polyetherimide of claim 4 wherein said hindered phenol is of the formula:

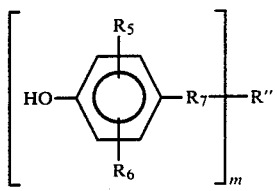

wherein m is 1 and, $R_5$ and $R_6$ are selected from the group of alkyl radicals having 2 to 10 carbon atoms and R" is of the following structural formula:

where n is an integer from 4 to 20.

5. The thermally stabilized polyetherimide of claim 1 wherein said hindered phenol is of the formula:

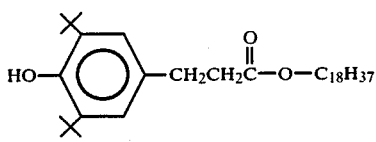

6. The thermally stabilized polyetherimide of claim 1, wherein said arylphosphonite is of the formula:

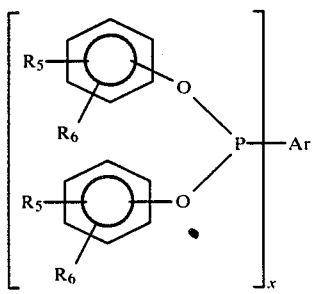

wherein x is an integer from 1 to 3, $R_5$ and $R_6$ may be the same or different and are selected from the group consisting of alkyl radicals having 1 to 20 carbon atoms, and Ar is a monocylic or polycyclic aromatic group containing from 6 to 18 carbon atoms.

7. The thermally stabilized polyetherimide of claim 6, wherein x is 2, $R_5$ and $R_6$ are independently selected from the group consisting of alkyl radicals having 2 to 10 carbon atoms and Ar is a polycyclic aromatic group having 12 to 18 carbon atoms.

8. The thermally stabilized polyetherimide of claim 7 wherein said arylphosphonite is of the formula:

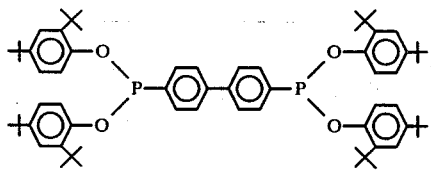

9. The thermally stabilized polyetherimide of claim 1 wherein said thioester is of the formula:

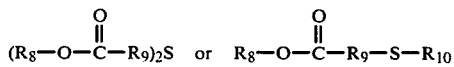

wherein $R_{10}$ is a lower alkyl of 6 to 18 carbon atoms and wherein each of $R_9$ may be the same or different from the other and is selected from the group of alkylene radicals having from 1 to 10 carbon atoms and $R_8$ may be the same or different from the other and is selected from the group consisting of hydrocarbon radicals having from 5 to 25 carbon atoms.

10. The thermally stabilized polyetherimide of claim 9 wherein said $R_8$ is an alkyl radical of from 10 to 20 carbon atoms and said $R_9$ is an alkylene radical having 2 to 6 carbon atoms.

11. The thermally stabilized polyetherimide of claim 10 wherein said thioester is of the formula:

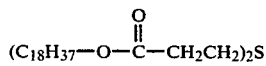

12. A thermally stabilized polyetherimide of claim 1 wherein said organic phosphite is of the formula:

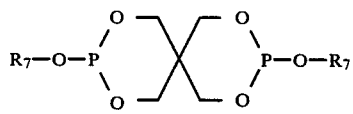

wherein $R_7$ may be the same or different and is selected from the group of radicals consisting of alkyls of from 15 to 25 carbon atoms, aryls of from 6 to 24 carbon atoms, and alkaryls having from 7 to 18 carbon atoms.

13. The thermally stabilized polyetherimide of claim 12 wherein said organic phosphite is of the formula:

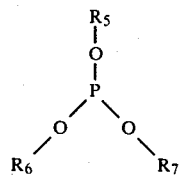

where $R_5$, $R_6$ and $R_7$ may be the same or different and are selected from the group of radicals consisting of alkyl having 12 to 25 carbon atoms, alkaryl having 10 to 14 carbon atoms and aryls of from 6 to 18 carbon atoms.

14. The thermally stabilized polyetherimide of claim 1 wherein said hindered phenol is of the following structural formula:

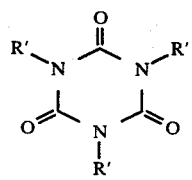

where R' is selected from the following formula:

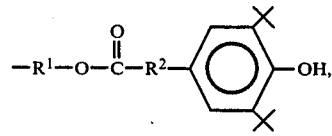

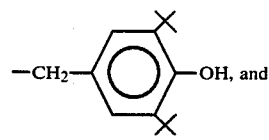

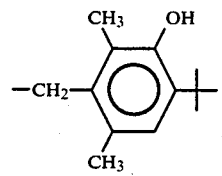

where $R_1$ and $R_2$ can be the same or different and are selected from the group of radicals consisting of alkylenes having from 1 to 10 carbon atoms.

15. The thermally stabilized polyetherimide of claim 14 wherein said $R_1$ and $R_2$ are alkylene radicals having 2 carbon atoms.

16. The thermally stabilized polyetherimides of claim 1 wherein the antioxidant is present in an amount from 0.02 weight percent to 1.0 weight percent of the stabilized polymer.

17. The thermally stabilized polyetherimides of claim 16 wherein the antioxidant is present in an amount from 0.05 to 1.0 weight percent of the stabilized polymer.

18. The thermally stabilized polyetherimide of claim 12 wherein said polyetherimide additionally contains a reactive epoxide of the formula:

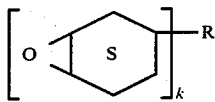

wherein k is an integer of from 1 to 3 and R is selected from the group of radicals consisting of alkylene having 1 to 10 carbon atoms, phenylene and said alkylene radicals and said phenylene groups further containing 1 or more ester or ether groups.

19. The thermally stabilized polyetherimide of claim 18 wherein said epoxide is of the formula:

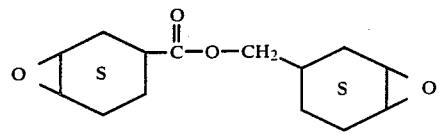

20. The thermally stabilized polyetherimide of claim 16 wherein there is present 0.1 to 0.5 weight percent of an arylphosphonite and 0.1 to 0.5 weight percent of an antioxidant selected from the class (a) hindered phenols (b) organic phosphites (c) thioesters and (d) mixtures thereof.

21. The thermally stabilized polyetherimide of claim 20 wherein there is present 0.1 to 0.5 weight percent of arylphosphonite and 0.1 to 0.5 weight percent of a hindered phenol.

22. A thermally stabilized polyetherimide of claim 1 wherein said antioxidant retains 95% of its original weight at a temperature of 190° C. when measuring a 5 mg sample of antioxidant at a heatup rate of 20° C. per minute in dry air.

23. A thermally stabilized polyetherimide of claim 1 wherein said antioxidant retains 95% of its original weight at the glass transition temperature of the polyetherimide.

* * * * *